United States Patent
Araki et al.

(12)

(10) Patent No.: US 6,180,713 B1
(45) Date of Patent: Jan. 30, 2001

(54) ONE-CAN MOISTURE-CURING URETHANE COMPOSITIONS

(75) Inventors: Kiminori Araki; Kazunori Ishikawa, both of Hiratsuka (JP)

(73) Assignee: The Yokohama Rubber Co., Ltd., Tokyo (JP)

(*) Notice: Under 35 U.S.C. 154(b), the term of this patent shall be extended for 0 days.

(21) Appl. No.: 09/403,276

(22) PCT Filed: Feb. 19, 1999

(86) PCT No.: PCT/JP99/00751

§ 371 Date: Oct. 18, 1999

§ 102(e) Date: Oct. 18, 1999

(87) PCT Pub. No.: WO99/42525

PCT Pub. Date: Aug. 26, 1999

(30) Foreign Application Priority Data

Feb. 19, 1998 (JP) .................................................. 10-037610

(51) Int. Cl.[7] ................................ C08J 3/00; C08K 5/49; C08L 75/00; C08G 18/00; C08G 18/08
(52) U.S. Cl. ........................ 524/590; 524/115; 524/123; 524/130; 524/133; 524/136; 524/147; 524/154; 524/589; 528/51; 528/52; 528/53; 528/44
(58) Field of Search .................................. 528/52, 51, 53, 528/44; 524/590, 589, 115, 123, 130, 133, 136, 147, 154

(56) References Cited

U.S. PATENT DOCUMENTS

| | | | | |
|---|---|---|---|---|
| 3,919,173 | * | 11/1975 | Coyner et al. ................. | 260/77.5 AT |
| 4,656,200 | * | 4/1987 | Clubley et al. ...................... | 521/108 |
| 5,089,559 | * | 2/1992 | Blount ................................... | 525/107 |

FOREIGN PATENT DOCUMENTS

| | | |
|---|---|---|
| 59-129256 | 7/1984 | (JP) . |
| 60-051724 | 3/1985 | (JP) . |
| 61-123617 | 6/1986 | (JP) . |
| 63-258951 | 10/1988 | (JP) . |
| 8-283563 | 10/1996 | (JP) . |

* cited by examiner

Primary Examiner—Patrick D. Niland
(74) Attorney, Agent, or Firm—Finnegan, Henderson, Farabow, Garrett & Dunner, L.L.P.

(57) ABSTRACT

A one-pack type moisture curable urethane composition comprising a urethane prepolymer and an amine catalyst, wherein 0.002 to 50 parts by weight, based upon 100 parts by weight of the urethane prepolymer, of phosphonic ester compounds, phosphonous ester compounds, phosphinous ester compounds or phosphine compounds or any mixture thereof is compounded to give the urethane composition having an improved storage stability, without decreasing the catalyst activity even when an amine catalyst having a high catalytic activity dimethylamino group structure etc. is used.

5 Claims, No Drawings

ONE-CAN MOISTURE-CURING URETHANE COMPOSITIONS

TECHNICAL FIELD

The present invention relates to a one-pack type moisture curable urethane composition suitable for use as, for example, a sealing agent for automobiles, buildings and structures, an adhesive, and a coating agent. More specifically, it relates to a one-pack type moisture curable urethane composition having an excellent storage stability in the absence of moisture without decreasing a catalyst activity and having a sufficient curability with atmospheric moisture.

BACKGROUND ART

To ensure the storage stability of curable urethane compositions, especially one-pack type moisture curable urethane compositions, malonate compounds such as diethyl malonate (DEM), dimethyl malonate (DMM), isopropyl malonate (IPM), etc. have been heretofore used. However, when the malonate compounds are used, in the presence of an isocyanate group, together with a relatively highly active catalyst having a structure such as a dimethylamino group, the catalyst activity is decreased. Therefore, there are problems that only catalysts having extremely limited structure such as those having a morpholine structure can be used. For this reason, since a large amount of catalysts having a relatively weak activity such as morpholine-based catalysts, etc. should be used, the use of the one-pack type moisture curable urethane compositions is extremely limited from the viewpoints of, for example, the curability characteristics and high cost.

DISCLOSURE OF INVENTION

Accordingly, the objects of the present invention are to provide a one-pack type moisture curable urethane composition capable of increasing the storage stability thereof without decreasing the catalyst activity even when amine catalysts having, for example, a dimethylamino group structure having a high catalytic activity are used.

In accordance with the present invention, there is provided a one-pack type moisture curable urethane composition comprising a urethane prepolymer and an amine catalyst and 0.002 to 50 parts by weight, based upon 100 parts by weight of the urethane prepolymer, of at least one storage stabilizer selected from the group consisting of phosphonic ester compounds, phosphonous ester compounds, phosphinous ester compounds and phosphines.

BEST MODE FOR CARRYING OUT THE INVENTION

According to the present invention, as mentioned above, the storage stability of the one-pack type moisture curable urethane composition can be increased, without impairing the activity of the amine catalysts by compounding thereinto phosphonic ester compounds, phosphophonous ester compounds, phosphinous ester compounds or phosphine compounds or any mixtures thereof. Thus, when phosphonic ester compounds, phosphonous ester compounds, phosphinous ester compounds or phosphine compounds or any mixtures thereof are used as a storage stabilizer for a one-pack type moisture curable urethane composition, the use of a catalyst having a structure such as a dimethylamino group becomes possible, various curability phenomena can be selected and a catalyst having a high activity can be used. As a result, the use of the composition becomes advantageous from the viewpoints of the cost.

The urethane prepolymers formulated into the urethane composition according to the present invention are known substances and include, for example, polyether polyols having a desired isocyanate functionality of 2.2–3.0 obtained by reacting 4,4'-diphenylmethane diisocyanate to a mixture of a polyol component such as polyetherpolyol having 3 or more hydroxyl group per molecule, e.g., polyoxypropylene triol, polyoxyethylene triol and a diol component such as polyether diol having 2 hydroxyl group per molecule, e.g., polypropylene ether diol, polyethylene ether diol. The preferable urethane prepolymers are those obtained by reacting mixtures of polyether triols having a number average molecular weight of 1000–7000, preferably 4000–6000 and polyether diols having a number average molecular weight of 1000–3000, preferably 1500–2500, with 4,4'-diphenylmethane diisocyanate, 2,4-tolylene diisocyanate, 2,6-tolylene diisocyanate, etc., in such a manner that an equivalent ratio of NCO/OH becomes 1.1–2.5, preferably 1.5–1.9.

The curing catalysts usable in the present invention are amine catalysts generally used in the one-pack type moisture curable urethane composition, such as, for example, dimorpholinodiethyl ether, N,N-dimethylcyclohexyl amine, N,N-dimethylaminoethyl morpholine, bis(2-dimethylaminoethyl)ether, N-methylmorpholine, triethylenediamine, 1-isobutyl-2-methylimidazol, N,N'-dimethyl piperazine, pentamethyldiethyl triamine, etc. Although there are no specific limitations to the amounts of the catalyst, the preferable amount is 0.002–10 parts by weight, more preferably 0.02–6 parts by weight, based upon 100 parts by weight of the urethane prepolymer.

The one-pack type moisture curable polyurethane compositions according to the present invention include, as a storage stabilizer, 0.002–50 parts by weight, preferably 0.005–3 parts by weight, based upon 100 parts by weight of the urethane prepolymer, of phosphonic ester compounds, phosphonous ester compounds, phosphinous ester compounds and/or phosphine compounds. When the formulating amount of the phosphonic ester compounds, phosphonous ester compounds, phosphinous ester compounds and/or phosphine compounds is too small, the storage stability and the catalyst deactivation cannot be unpreferably suppressed, whereas when the amount is too large, the decrease in the properties after the curing becomes unpreferably remarkable.

The phosphonic ester compounds, phosphonous ester compounds, phosphinous ester compounds and/or phosphine compounds usable, as a storage stabilizer, in the present invention include, for example, organic phosphorous compounds having the formula:

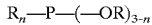

$$R_n\text{—}P\text{—}(\text{—}OR)_{3-n}$$

wherein R represents a univalent or bivalent linear or cyclic organic group and n is an integer of 0–3.

Examples of the phosphonic ester compounds usable in the present invention are triphenyl phosphite, tris(nonylphenyl) phosphite, triethyl phosphite, triisopropyl phosphite, triisobutyl phosphite, tridecyl phosphite, triisodecyl phosphite, tris(tridecyl)phosphite, tri(2-ethylhexyl) phosphite, diphenylmono(2-ethylhexyl)phosphite, diphenylmonodecyl phosphite, diphenylmono(tridecyl)phosphite, dilauryl hydrogen phosphite, dioleyl hydrogen phosphite, diphenyl hydrogen phosphite, tetraphenyl dipropylene glycol diphosphite, tetraphenyl tetra(tridecyl)pentaerythritol tetraphosphite, tetra(tridecyl)-4,4'-isopropylidene diphenyldiphosphite, trilauryltrithio phosphite, bis(tridecyl)pentaerythritol diphosphite, bis(nonylphenyl)pentaerythritol diphosphite, tris(2,4-di-t-butylphenyl) phosphite, tricyclohexyl phosphite, dicyclohexyl-2,4-di-t-butylphenyl phosphite, hydrogenated bisphenol A-pentaerythritol phosphite polymer, hydrogenated bisphenol A phosphite polymer, etc.

The phosphonous ester compounds usable in the present invention include phenyl phosphonous diethyl ester, 2-phenyl-1,3,2-dioxaphosphorun, etc. The phosphinous ester compounds include diphenylphosphinous ethyl ester, diphenylphosphinous butyl ester, etc.

Examples of the phosphine compounds usable in the present invention are triphenyl phosphine, triorthotolyl phosphine, trimethatolyl phosphine, triparatolyl phosphine, tris-4-methoxyphenyl phosphine, diphenylcyclohexyl phosphine, dicyclohexylphenyl phosphine, tricyclohexyl phosphine, trioctyl phosphine, tributyl phosphine, 1,2-bis(diphenylphosphino)ethane, 1,3-bis(diphenylphosphino)propane, 1,4-bis(diphenylphosphino)butane, tribenzylphosphine, etc.

The one-pack type moisture curable urethane composition according to the present invention may further contains, in addition to the above-mentioned essential components, fillers, plasticizers, solvents, etc., which are inactive to the isocyanate group, to impart the desired properties, etc. Examples of the fillers are carbon blacks, clays, talcs, calcium carbonate, etc. or any mixture thereof. Examples of the plasticizers are phthalic acid derivatives such as dibutyl phthalate, dioctyl phthalate, derivatives of tetrahydrophthalic acid, azelaic acid, maleic acid, trimellitic acid, isophthalic acid, adipic acid, itaconic acid, citric acid, etc. Examples of the solvents are aromatic hydrocarbon solvents such as toluene, xylene, etc.

Although there are no limitations in the urethane composition of the present invention, the components, other than the curing catalyst and solvent, are sufficiently mixed under a reduced pressure to be uniformly dispersed and, then, the curing catalyst dissolved in a solvent such as xylene is added, followed by further thoroughly mixing under a reduced pressure to obtain the desired composition.

EXAMPLES

The present invention will now be further illustrated by, but is by no means limited to, the following Examples.

Examples 1–13 and Comparative Examples 1–5

Polyether triol having a number average molecular weight of 5000 and polyether diol having a number average molecular weight of 2000 were mixed at weight ratio of 6/4 and, after dewatering at a temperature of 110° C., the molten 4,4'-diphenylmethane diisocyanate was added thereto in such an amount that the equivalent ratio of NCO group/OH group becomes 1.7. The mixture was mixed while stirring at 80° C. under a nitrogen atmosphere for 36 hours. To the polyurethane prepolymer thus obtained, 30 parts by weight of dioctyl phthalate (DOP) as a plasticizer, 70 parts by weight of carbon black, both based upon 100 parts by weight of the polyurethane prepolymer, followed by mixing under vacuum in a mixer for one hour and then bis(2-dimethylaminoethyl)ether as a catalyst and the storage stability shown in Table I were formulated in the amounts (parts by weight) shown in Table I. The mixture was mixed at 40° C. under vacuum for 10 minutes to obtain the urethane composition, and the storage stability, the curability and the decrease in the tensile strength were determined as follows. The results are shown in Table I.

(1) Storage Stability

After the formulation, regarding those after allowing to stand at 20° C. for 24 hours and those after allowing to stand at 20° C. for 3 months, the viscosities thereof were determined.

(2) Curability

After formulation, regarding those after allowing to stand at 20° C. for 24 hours and those after allowing to stand at 20° C. for 3 months, the times by which the surface tacks disappeared after coating were determined at 20° C. and 65%RH.

(3) Decrease in Tensile Strength

The composition was cured at 20° C. and 65%RH for 7 days to 3 mm thickness to prepare a JIS#3 (tensile) dumbell. Thereafter, the dumbell was drawn at 20° C. at a rate of 500 mm/min to determine the tensile strength at break. The decrease % of the strength when the phosphonic ester or phosphine compound was determined when compared with the strength of blank where neither the phosphonic acid nor the phosphine compound was added.

TABLE I

| | Example | | | | | | | | | | | | | Comparative Example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| Urethane Prepolymer | 100 | 100 | 100 | 100 | 100 | 100 | 100 | 100 | 100 | 100 | 100 | 100 | 100 | 100 | 100 | 100 | 100 | 100 |
| Carbon Black | 70 | 70 | 70 | 70 | 70 | 70 | 70 | 70 | 70 | 70 | 70 | 70 | 70 | 70 | 70 | 70 | 70 | 70 |
| DOP | 30 | 30 | 30 | 30 | 30 | 30 | 30 | 30 | 30 | 30 | 30 | 30 | 30 | 30 | 30 | 30 | 30 | 30 |
| Catalyst | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 |
| Triphenylphosphine | 0.002 | 0.2 | 0.2 | 2 | 50 | — | — | — | — | — | — | — | — | — | 0.001 | 70 | — | — |
| Triorthotolyl-phosphine | — | — | — | — | — | 0.2 | — | — | — | — | — | — | — | — | — | — | — | — |
| Trimethatolyl-phosphine | — | — | — | — | — | — | 0.2 | — | — | — | — | — | — | — | — | — | — | — |
| Triparatolyl-phosphine | — | — | — | — | — | — | — | 0.2 | — | — | — | — | — | — | — | — | — | — |
| Tris-4-methoxyphenyl-phosphine | — | — | — | — | — | — | — | — | 0.2 | — | — | — | — | — | — | — | — | — |

TABLE I-continued

| | Example | | | | | | | | | | | | | Comparative Example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| Triisobutylphosphite | — | — | — | — | — | — | — | — | — | 0.2 | — | 0.2 | 6 | — | — | — | 0.001 | 60 |
| Tricyclohexylphosphine | — | — | — | — | — | — | — | — | — | — | 0.2 | 0.1 | 10 | — | — | — | — | — |
| Storage stability | | | | | | | | | | | | | | | | | | |
| 24 hrs (PS) | 600 | 600 | 600 | 600 | 600 | 600 | 600 | 600 | 600 | 600 | 600 | 600 | 600 | 600 | 600 | 615 | 600 | 600 |
| 3 months (PS) | 630 | 630 | 640 | 625 | 630 | 630 | 630 | 630 | 630 | 630 | 630 | 640 | 625 | 750 | 690 | 635 | 690 | 610 |
| Curability | | | | | | | | | | | | | | | | | | |
| 24 hrs (min) | 40 | 40 | 30 | 40 | 40 | 40 | 40 | 40 | 40 | 40 | 40 | 30 | 40 | 40 | 40 | 41 | 40 | 43 |
| 3 months (min) | 42 | 39 | 29 | 39 | 41 | 40 | 39 | 39 | 40 | 39 | 40 | 29 | 39 | 85 | 70 | 40 | 70 | 43 |
| Decrease Rates in Tensile Strength (%) | 0 | 0 | 0 | 0 | 10 | 0 | 10 | 0 | 0 | 0 | 0 | 0 | 4 | 0 | 0 | 30 | 0 | 40 |

INDUSTRIAL APPLICABILITY

As explained above, by using phosphonic ester compounds, phosphophonous ester compounds, phosphinous ester compounds and/or phosphine compounds as a urethane storage stabilizer, the use of a catalyst having a dimethylamino group structure becomes possible, and therefore, the various curing phenomena can be selected and the use of the highly active catalyst becomes possible, which are practically advantageous also from the viewpoints of cost.

What is claimed is:

1. A one-pack moisture curable urethane composition comprising a urethane prepolymer and an amine catalyst and 0.002 to 50 parts by weight, based upon 100 parts by weight of the urethane prepolymer, of at least one storage stabilizer having the formula (I):

$$R_n\text{—P—}(\text{—OR})_{3-n} \tag{I}$$

wherein R represents a univalent or bivalent linear or cyclic organic group and n is an integer of 0–3.

2. The composition of claim 1, wherein the amine catalyst is a catalyst having a morpholine or dimethyl amino group structure.

3. The composition of claim 1, wherein a polyol component of the urethane prepolymer is a polyetherpolyol having an isocyanate functionality of 2.2 to 3.0.

4. The composition of claim 2, wherein a polyol component of the urethane prepolymer is a polyetherpolyol having an isocyanate functionality of 2.2 to 3.0.

5. The composition of claim 1, wherein said storage stabilizer is selected from the group consisting of triphenyl phosphine, triorthotolyl phosphine, trimethatolyl phosphine, triparatolyl phosphine, tris-4-methoxyphenyl phosphine, diphenylcyclohexyl phosphine, dicyclohexylphenyl phosphine, tricyclohexyl phosphine, trioctyl phosphine, tributyl phosphine, 1,2-bis(diphenylphosphino)ethane, 1,3-bis(diphenylphosphino) propane, 1,4-bis(diphenylphosphino)butane and tribenzylphosphine.

* * * * *